United States Patent [19]
McLaren

[11] Patent Number: 5,867,208
[45] Date of Patent: Feb. 2, 1999

[54] ENCODING SYSTEM AND METHOD FOR SCROLLING ENCODED MPEG STILLS IN AN INTERACTIVE TELEVISION APPLICATION

[75] Inventor: David L. McLaren, MTV, Calif.

[73] Assignees: Sun Microsystems, Inc., Palo Alto, Calif.; Thompson Consumer Electronics, Inc., Indianapolis, Ind.

[21] Appl. No.: 959,560

[22] Filed: Oct. 28, 1997

[51] Int. Cl.[6] ..................................................... H04N 7/14
[52] U.S. Cl. ........................... 348/13; 345/327; 348/563; 348/12; 348/10
[58] Field of Search .............................. 348/12, 13, 563, 348/569, 906, 10, 7; 455/5.1; 345/352, 353, 327, 328

[56] References Cited

U.S. PATENT DOCUMENTS

| | | | |
|---|---|---|---|
| 5,619,249 | 4/1997 | Billack et al. | 348/13 |
| 5,621,456 | 4/1997 | Florin et al. | 348/13 |
| 5,682,511 | 10/1997 | Sposato et al. | 348/10 |
| 5,686,954 | 11/1997 | Yoshinobu et al. | 348/460 |
| 5,754,258 | 5/1998 | Hanaya et al. | 348/13 |
| 5,798,785 | 8/1998 | Henhides et al. | 348/70 |

*Primary Examiner*—Victor R. Kostak
*Attorney, Agent, or Firm*—Conley, Rose & Tayon; Jeffrey C. Hood; Louis H. Iselin

[57] ABSTRACT

A system and method for scrolling in a picture which is larger than MPEG standard in length or width or both in a video system, such as an interactive television system. In the preferred embodiment, the interactive television system comprises a video delivery system for providing video content, and at least one subscriber television including a display screen, wherein the subscriber television is coupled to the video delivery system. The video delivery system provides the compressed picture. The compressed picture has a length and/or a width which is larger than MPEG standard or alternatively is larger than the desirable viewing size. The compressed picture is subdivided into slices and possibly groups of slices such that the image may be smoothly scrolled. The subscriber television receives the compressed picture and operates to scroll in the compressed picture as desired by the user. The scrolling operation preferably includes providing additional compressed picture slices for decoding in place of slices in a previously viewed image of a portion of the compressed picture. The subscriber television then decodes the resulting picture and displays a next portion of the scrolled picture.

38 Claims, 14 Drawing Sheets

SECOND EMBODIMENT SCROLLING ROUTINE

ENCODING SYSTEM AND METHOD FOR SCROLLING ENCODED MPEG STILLS IN AN INTERACTIVE TELEVISION APPLICATION

BACKGROUND OF THE INVENTION

1. Field of the Invention

The present invention is related to interactive video delivery mediums such as interactive television, and more particularly to a system and method for generating and scrolling pictures in an interactive television application.

2. Description of the Related Art

Interactive television is an interactive audio/video delivery medium which provides broadcast audiovisual content to a number of subscribers. Interactive television provides broadcast video and audio to users and also provides a return path for the user to interact with the content, e.g., to make selections or order desired products, etc. To provide content with maximum bandwidth efficiency, interactive television systems may compress their content with an audio/video or image compression technique. The system at the subscriber's location must then be able to decompress the content for local display or replay.

The Internet is a world wide collection of inter-connected networks. In the last several years, the Internet has been growing at an exponential rate. The major attribute that these inter-connected networks share is use of the Transmission Control Protocol/Internet Protocol (TCP/IP) communications protocol. Several different protocols are used for making information available on the Internet. Among these are the text-only, hierarchical Gopher protocol and the Hyper Text Transfer Protocol (HTTP) used on the hypertext, multimedia World Wide Web (WWW or Web).

In many applications it is desirable to display still pictures or images on an interactive television system. Examples include the display of advertising pictures, electronic program guides or other content, for an interactive television application. Another example is an interactive television system used for Internet activities, such as web browsing. The use of an Internet capable television system for web browsing is often generally referred to as web TV. The transmission and display of still images or pictures, such as Internet files, through an interactive television system is hampered by the need to compress the large size and quantity of files required to be transmitted to the subscriber. Compression becomes complicated by the consideration that it may be desirable to provide still images or pictures with different, unique sizes. Therefore, the need exists to be able to compress Internet files in such a way that they can be decoded in a standard manner.

Also, in many cases it is desirable to provide still images or pictures to a television system which are larger than the viewing size of the television. For example, Internet web pages are typically larger than the viewing screen of a computer display. Thus, to provide or simulate web browsing capabilities in an interactive television environment, it is necessary or desirable to be able to provide still pictures to the television which are larger than the viewing area of the television. This is complicated by the fact that many compression standards require a standard, fixed image size, for compression and decompression purposes. When pictures are provided to a television which are larger than the viewing size of the television, it is necessary to provide the user with the capability to scroll down and/or across the display screen, much like the user can scroll through an image on a computer screen. However, providing a user in an interactive television application with the ability to scroll through an image is complicated by the video compression used in sending still pictures to the television. Therefore, a system and method is desired which enables a user to scroll through pictures in an interactive television application.

MPEG Background

Background on MPEG compression is deemed appropriate. A common compression technique used in an interactive television environment is referred to as MPEG (Moving Pictures Experts Group). MPEG compression is a set of methods for compression and decompression of fall motion video images which uses interframe and intraframe compression techniques. MPEG compression uses both motion compensation and discrete cosine transform (DCT) processes, among others, and can yield compression ratios of more than 200:1.

The two predominant MPEG standards are referred to as MPEG-1 and MPEG-2. The MPEG-1 standard generally concerns inter-field data reduction using block-based motion compensation prediction (MCP), which generally uses temporal differential pulse code modulation (DPCM). The MPEG-2 standard is similar to the MPEG-1 standard, but includes extensions to cover a wider range of applications, including interlaced digital video such as high definition television (HDTV).

An MPEG stream includes three types of pictures, referred to as the Intra (I) frame, the Predicted (P) frame, and the Bi-directional Interpolated (B) frame. The I or Intra frames contain the video data for the entire frame of video and are typically placed every 10 to 15 frames. Intra frames provide entry points into the file for random access, and are generally only moderately compressed. Predicted frames are encoded with reference to a past frame, i.e., a prior Intra frame or Predicted frame. Thus P frames only include changes relative to prior I or P frames. In general, Predicted frames receive a fairly high amount of compression and are used as references for future Predicted frames. Thus, both I and P frames are used as references for subsequent frames. Bi-directional pictures include the greatest amount of compression and require both a past and a future reference in order to be encoded. Bi-directional frames are never used as references for other frames.

An MPEG encoder divides respective frames into a grid of 16×16 pixel squares called macroblocks. The respective frames are divided into macroblocks in order to perform motion estimation/compensation. Each picture is comprised of a plurality of slices. The MPEG standard defines a slice as a contiguous sequence of 2 or more macroblocks (16×16 pixel blocks) that begin and end on the same row of macroblocks. A slice begins with a header including a slice start code and information indicating the horizontal and vertical location where the slice begins in the picture. Furthermore, header information is provided for in the MPEG standards for each piece of the overall picture. Each macroblock, slice, frame, etc. has its own header containing information about the particular picture piece as well as its placement in the next larger piece of the overall picture.

SUMMARY OF THE INVENTION

The present invention comprises a system and method for scrolling a picture which is larger then the allowed size of an MPEG encoded picture in a video system, such as an interactive television system. In the preferred embodiment, the interactive television system comprises a video delivery system for providing video content, and at least one subscriber television including a display screen, wherein the subscriber television is coupled to the video delivery system.

According to the present invention, the video delivery system provides or broadcasts a compressed picture. The compressed picture is larger, i.e., wider and/or longer, than a standard MPEG picture. The compressed picture comprises a plurality of slices, wherein the plurality of slices are compressed with a slice structure to facilitate scrolling, and wherein the plurality of slices include one or more slices which are independently compressed. The slices are encoded with a predetermined slice structure and are preferably independently compressed to enable scrolling according to the present invention. The subscriber television receives the compressed picture or a portion of the compressed picture. The subscriber television initially displays a default portion of the compressed picture, wherein the size of the default portion fits the display area of the television and/or is a standard MPEG size.

When the user wishes to scroll the image on the screen, the user provides scrolling input to the subscriber television. In response to receiving the scrolling input, the subscriber television provides the appropriate slices which make up the new desired portion of the picture to the decoder. The decoder then decodes those slices for viewing on the display screen of the subscriber television. Thus, the user selects the desired portion of the picture to be viewed, and the subscriber television operates to send the appropriate slices which make up the desired portion of the picture to be viewed to the decoder. In this manner, the user can scroll through different parts of the picture. Also, the subscriber television only provides slices to the decoder which correspond to a display area of a television and/or a standard MPEG size, and then the decoder only receives and decodes pictures of that size.

In one embodiment, the video delivery system initially only provides to the subscriber television a portion of an MPEG picture which corresponds to a standard MPEG size. Thus, when the subscriber television receives scrolling input from the user, the subscriber television requests additional slices from the video delivery system. This reduces the amount of memory required by the subscriber television decoder or set top box. In another embodiment, the video delivery system initially provides all of the slices corresponding to the entire picture to the subscriber television. In this embodiment, the subscriber television selectively provide slices to the decoder, which correspond to a standard size MPEG picture, based on user scrolling input.

In one embodiment the video delivery system also preferably provides a table indicating the starting points of each slice comprising the compressed picture. The subscriber television receives the table and provides the user requested slices to the decoder using the table locations for each slice.

The present invention also includes a system and method for creating and encoding a compressed picture which is larger than standard viewing size, as well as a method for creating the corresponding slice starting point tables. As noted above, the compressed pictures are created with appropriate slice structures to enable compressed slices to replace other slices in a compressed picture as the picture is scrolled on a television display screen.

BRIEF DESCRIPTION OF THE DRAWINGS

A better understanding of the present invention can be obtained when the following detailed description of the preferred embodiment is considered in conjunction with the following drawings, in which:

FIG. 4C illustrates different horizontal scrolling positions of the picture;

DETAILED DESCRIPTION OF THE EMBODIMENTS

The present invention comprises a system and method for scrolling in a picture which is larger than the allowed size of an MPEG image in a video delivery system. The present invention also allows for scrolling in a picture which is larger than the viewing area of a screen, such as a television screen or computer screen. In the preferred embodiment, the system and method are comprised in an interactive television system. However, it is noted that the present invention may be included in any of various types of video systems, including standard television, interactive television, the Internet, and other types of video or graphics delivery mediums. The term "video" as used herein is intended to include still images, graphics, and live action or motion video.

Interactive Television System

Figure 1:
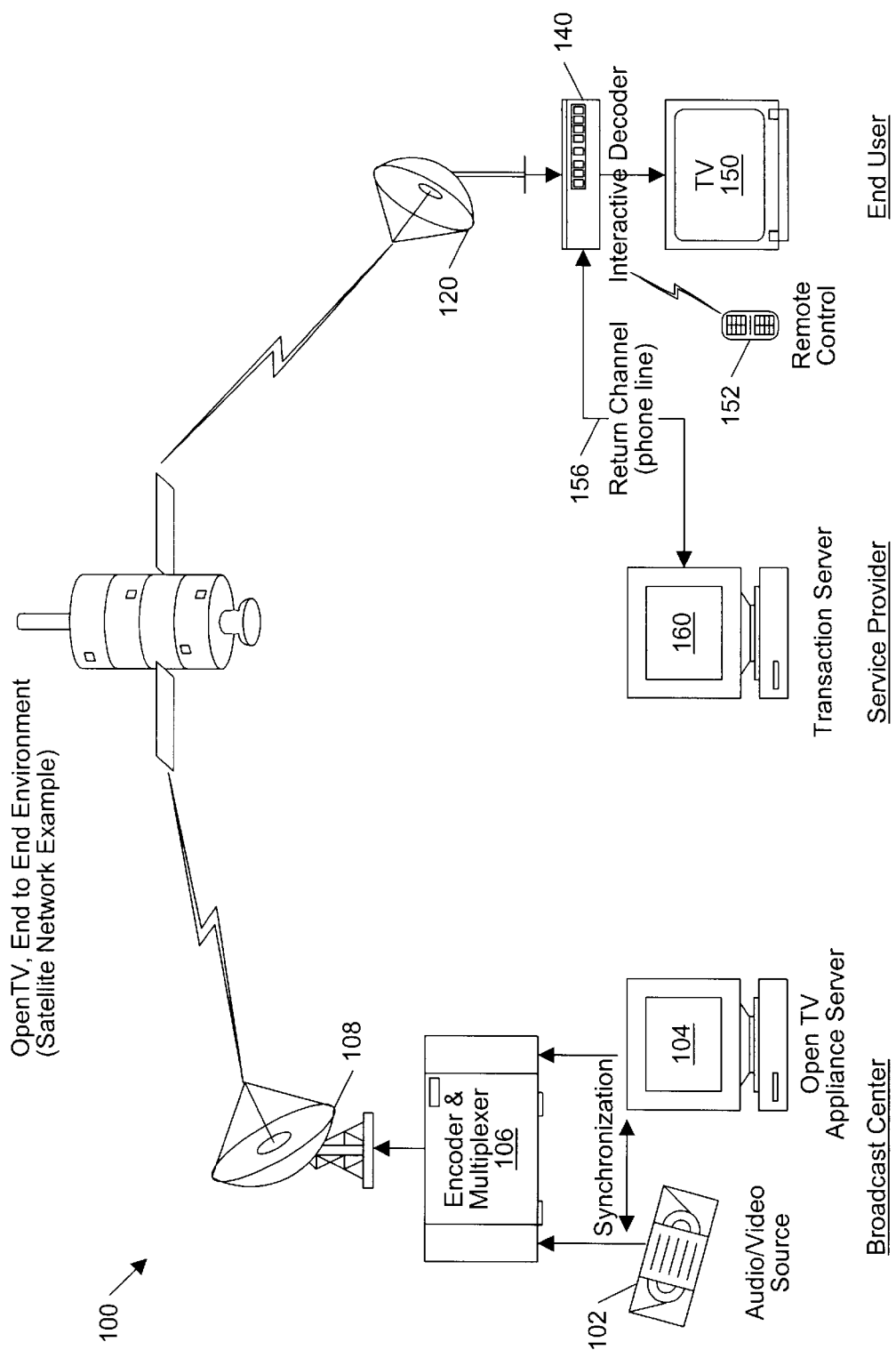
FIG. 1 illustrates an interactive television system.

Referring now to FIG. 1, a block diagram of an interactive television system according to one embodiment of the present invention is shown. It is noted that FIG. 1 is illustrative only, and other interactive television system embodiments may be used, as desired.

As shown, the interactive television system employs a broadcast center 100 for generating audiovisual content, including interactive audiovisual content. The broadcast center 100 includes an audio/video source 102 for providing the audiovisual content. The audiovisual content may comprise movies, sports, news, sitcoms or other audiovisual programming, as is normally seen on television. The audiovisual content preferably comprises still images which may be used for various purposes. These still images preferably include pages from the Web. The audiovisual content may include background pictures or images, as well as insert pictures or overlays which are designed to be overlaid on the background picture. The Web pages, background pictures and insert pictures may comprise still images or portions of a motion video sequence, as desired. According to the present invention, the audiovisual content includes MPEG encoded images which are larger than a standard MPEG size.

Figure 2:
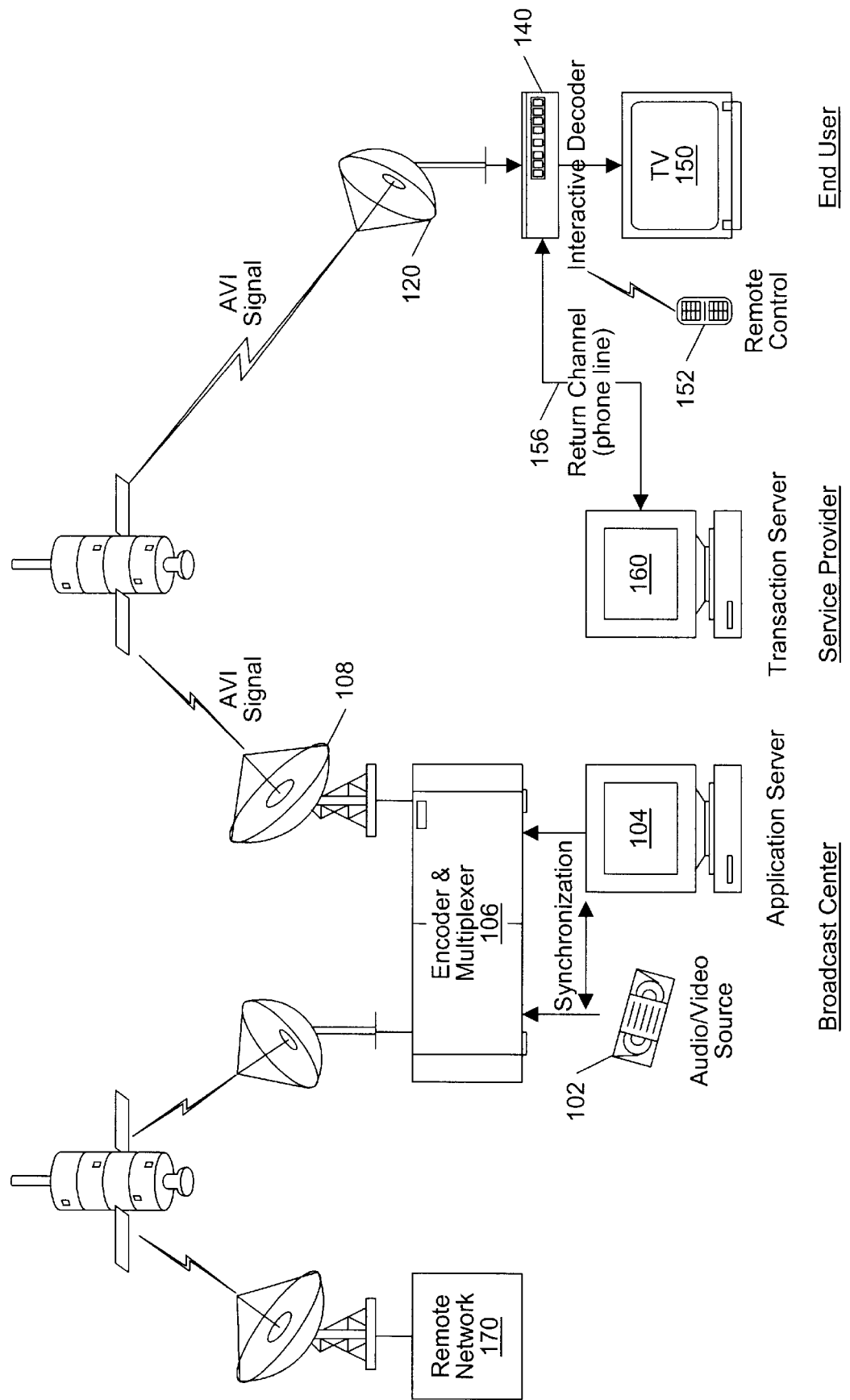
FIG. 2 illustrates the interactive television system of FIG. 1 which includes a remote network that provides programming content.

The audio/video source 102 may include video compression logic for compressing still video images into compressed still video images. As shown in FIG. 2, the audiovisual content may also be supplied by a remote network 170 or a live feed, as desired.

The broadcast center 100 also includes an application server 104 for creating and/or generating interactive application content. The interactive application content comprises application code and data which is designed to be executed by a processor within a set top box or television to support an interactive television feature. The application server 104 is preferably configured for generating or providing "OpenTV" interactive applications. The application server may also provide "Java" applets or other interactive program content, as desired.

An Encoder/Multiplexer 106 combines the interactive application content with the audiovisual content to produce an audio-video-interactive (AVI) signal. The Encoder/Multiplexer 106 also synchronizes the interactive application content with the audiovisual content to ensure that the interactive application content is inserted in the proper position within the audiovisual content. It is noted that certain channels may comprise noninteractive programming content. In other words, certain audiovisual content may not have associated interactive content. The Encoder/Multiplexer 106 preferably multiplexes a plurality of signals, including AVI signals and optionally non-interactive signals, together for transmission.

The broadcast center 100 also includes an uplink satellite 108 for transmitting the broadcast signal for receipt by end-users or a subsequent distribution link. It is noted that FIG. 1 illustrates a satellite network example where a satellite is used to transmit the broadcast signal. However, it is noted that other transmission methods may be used, including cable distribution through coaxial cable, fiber optic transmission, microwave transmission or other means.

The broadcast signal is received from broadcast center 100 via a satellite downlink 120. The broadcast signal is then provided to a plurality of subscribers. As noted above, the broadcast signal includes one or more AVI signals on respective channels, and may include one or more noninteractive program signals.

As shown, each end user or subscriber preferably includes a set top box or interactive decoder 140 as well as a television set 150. The set top box or interactive decoder 140 is coupled to the television set 150. It is noted that the interactive decoder logic may be comprised in the television 150 instead of being comprised as a separate unit 140. Also, the television may comprise a general purpose programmable computer having a display screen, or other viewing device, as desired.

In the present disclosure, the term "subscriber television" is intended to include the television set 150 or other viewing device, such as a computer, LCD (liquid crystal display) screen, etc., and may include associated decoder logic for decoding compressed video and/or executing interactive programs. For example, in one embodiment, the subscriber television comprises the television set 150 coupled with the interactive decoder or set top box 140.

The television 150 includes a remote control 152 which facilitates user interaction with the television 150 and/or interactive decoder 140. The user can select desired television channels for viewing or provide various interactive selections. Once a picture has been selected, if the picture has a size larger than a standard MPEG size, the user may use the remote control 152 to scroll vertically and/or horizontally within the picture as desired, according to using the present invention.

The signal on the selected television channel is decoded by the interactive decoder 140 which provides an output to the television set 150. The interactive decoder 140 preferably executes a real time operating system, such as OpenTV from Thomson Electronics. Where the channel being viewed comprises an AVI signal, the interactive decoder 140 also executes an interactive application program conveyed within the selected AVI signal to enable an interactive television feature.

A return channel 156 interconnects the interactive decoder 140 to a transaction server 160, which monitors certain selections by the user and responds accordingly, as desired. The return channel 156 preferably utilizes a standard POTS (plain old telephone system) phone line and associated modems (not shown) for communication. Other return channel options, such as coaxial cable, fiber optic cable, DSL (Digital Subscriber Line), ATM (Asynchronous Transfer Mode), or others, may be used, as desired.

The broadcast center 100 provides a plurality of program channels each comprising audiovisual content. One or more program channels comprise AVI signals including audiovisual content and associated interactive applications. The encoder 106 at the broadcast center 100 is operable to transmit compressed pictures, including compressed pictures which are larger than a standard MPEG size. The encoder 106 encodes pictures which have a nonstandard or larger MPEG size with the necessary slice structure for scrolling of the pictures. The encoder 106 is also operable to transmit slice maps to assist in the scrolling.

Therefore, in the preferred embodiment, at least a subset of the AVI signals include compressed pictures which are larger than the standard MPEG size. These AVI signals preferably include interactive applications which are executable to scroll through the compressed picture which is larger than the MPEG standard. The compressed pictures may be larger than the standard MPEG size either in length or width or both. The interactive application thus operates to display a selected portion of a picture based on user scrolling input. The logic and/or software which operates to enable a user to scroll through a respective picture may also reside permanently on the set top box 140, instead of being transferred as an interactive applet.

Figure 3:
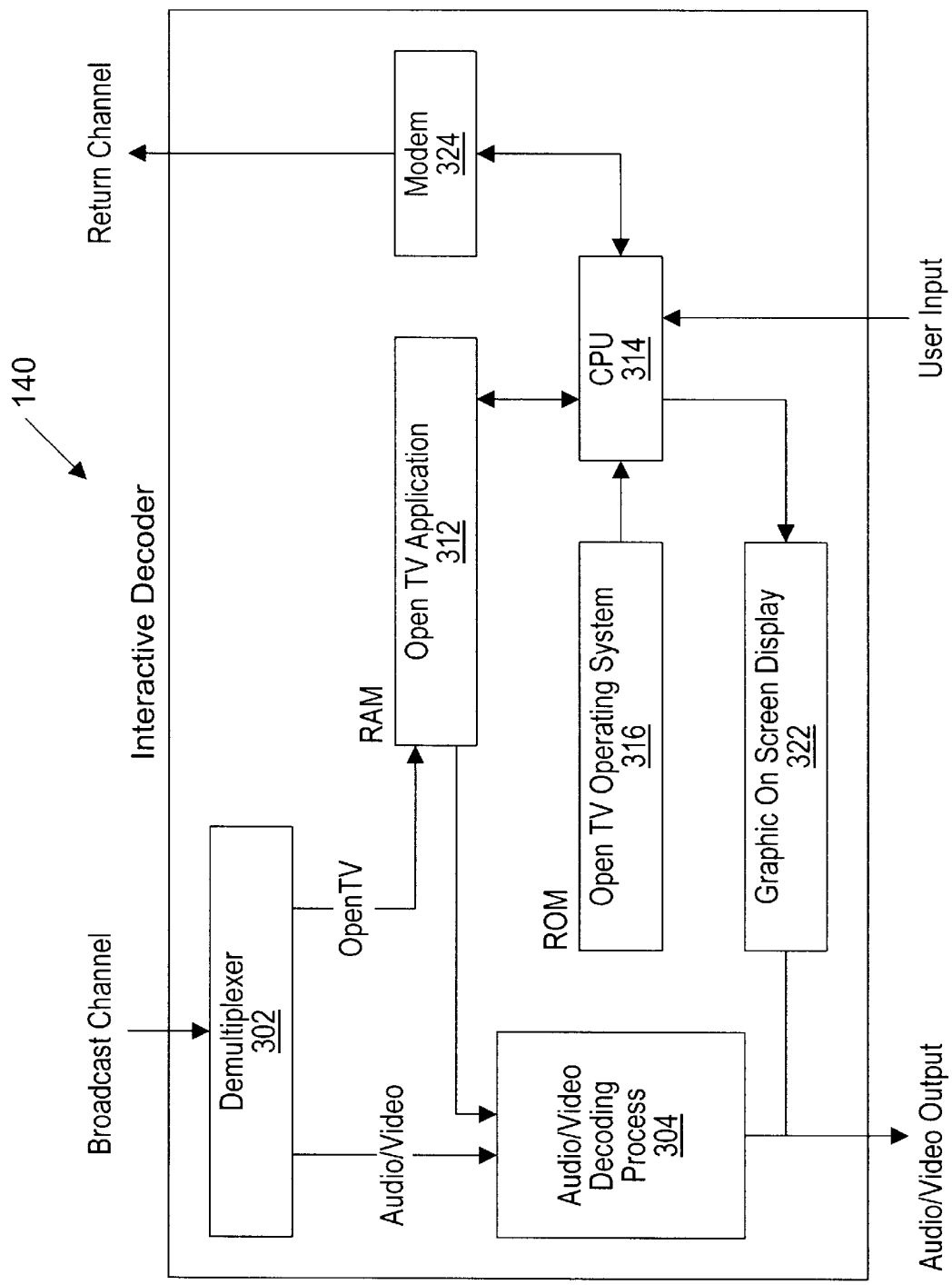
FIG. 3 is a block diagram of the interactive decoder of FIGS. 1 and 2.

FIG. 3—Interactive Decoder

Referring now to FIG. 3, a block diagram illustrating the set top box or interactive decoder 140 is shown. As shown, the interactive decoder 140 includes an input for receiving a broadcast signal over a channel. The broadcast signal preferably comprises a plurality of channels comprising programming content, such as movies, sports, television shows, news, advertising, etc. At least a subset, i.e., one or more, of the program channels comprises an AVI (audio video interactive) signal which comprises an audiovisual component as well as an interactive program component as described above. The audiovisual component is preferably compressed, preferably MPEG compressed. As noted above, the broadcast signal, preferably the interactive program content, may include one or more compressed pictures that are larger than MPEG standard size in either length or width or both. The broadcast signal also preferably includes associated slice map information for these pictures.

The broadcast channel signal is provided to a demultiplexer 302 in the interactive decoder 140. The demultiplexer 302 operates to separate the audio/video component from the interactive component. In the preferred embodiment of the invention, the interactive component comprises an interactive application and/or data which is compliant with the OpenTV standard promulgated by Thomson Electronics. However, it is noted that other types of interactive applications may be included in the AVI signal, as desired.

The demultiplexer 302 provides the audio/video component to an audio/video decoding block 304. The decoding block 304 operates to decode the compressed audiovisual data stream to produce decompressed data. In the preferred embodiment, the broadcast channel transports MPEG-2 compressed data. Thus, in the preferred embodiment, the decoding process block 304 preferably includes an MPEG-2 decoder for decompressing or decoding the encoded data. The decoder 304 preferably includes one or more DSPs and one or more associated memories. It is noted that the decoder may comprise various types of logic, including one or more DSPs, CPUs, or microcontrollers, discrete logic, or combinations thereof.

The decoding process block 304 provides an audio/video output which is preferably provided to the television 150 for display. When the decoding block 304 receives compressed slices from the memory, the decoding block 304 decompresses the slices and provides the decompressed slices to the display unit.

The interactive decoder 140 includes a memory 316, preferably a read only memory (ROM), which stores the interactive application operating system. The operating system is preferably the OpenTV operating system from Thomson Electronics. A CPU 314 is coupled to the ROM 316.

The interactive program component which is provided by the output of the demultiplexer 302 is provided to a memory 312, preferably a random access memory (RAM), which stores the interactive application, i.e., the OpenTV application. The CPU 314 is coupled to the interactive application RAM 312. Thus, the interactive application from the AVI signal is stored in the RAM 312, and the CPU 314 can read the application from the RAM 312 and execute the application.

Thus, the CPU 314 reads the OpenTV operating system from the ROM 316, whereby the operating system controls the operation of the CPU 314. The CPU 314 also reads the interactive application from the RAM 312, which was provided with the AVI signal, and executes this interactive application under control of the OpenTV operating system stored in ROM 316.

In the embodiment of FIG. 3, compressed pictures which are larger than MPEG standard in length or width or both are comprised in the interactive application. Thus, in this embodiment, the compressed pictures which are larger than MPEG standard in length or width or both are included as part of the interactive application, and not as part of the audiovisual component. In this embodiment, the compressed pictures are received by the demultiplexer 302 and then temporarily stored in the RAM 312. In various embodiments, either a portion or all of a compressed picture of nonstandard MPEG size is stored in the RAM 312, as described further below.

Figure 3A:
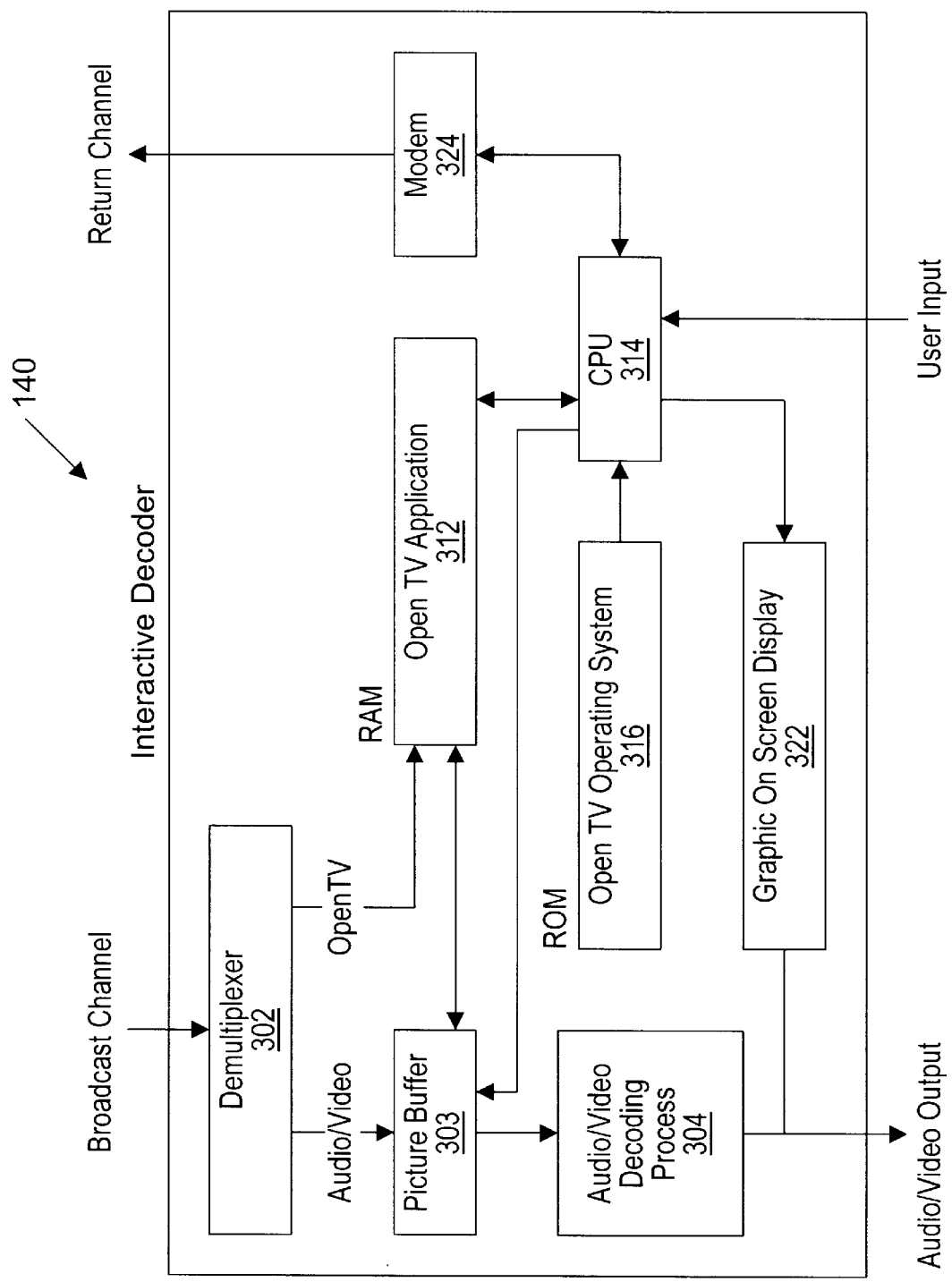
FIG. 3A is an alternate embodiment of the interactive decoder of FIG. 3.

Referring briefly to FIG. 3A, in another embodiment, portions of compressed pictures which are larger than standard MPEG size are comprised in the audio/video portion of the signal. In this embodiment, the audio/video decoding block includes a picture buffer 303 having a size corresponding at least to a standard MPEG size. The picture buffer 303 receives and stores the portions of compressed pictures and selectively provides slices to the decoder 304, as discussed further below.

The interactive component preferably also includes at least one slice map to assist in scrolling in compressed pictures which are larger than the MPEG standard. In other words, the video delivery system preferably provides slice maps with any compressed pictures of nonstandard MPEG size to aid in scrolling in the compressed picture.

The RAM 312 includes an output coupled to the decoder 304, as shown. The CPU 314 controls the output from the RAM 312 to provide MPEG slices to the decoder 304. More specifically, the CPU 314 directs the RAM 312 to provide slices from compressed pictures to the decoder 304 to accomplish scrolling in compressed pictures larger than MPEG standard size according to the present invention. The CPU 314 preferably executes the interactive application and uses any slice maps stored in the RAM 312 to provide the slices to the decoder 304 in the proper order for scrolling.

As discussed further below, scrolling in a compressed picture larger than MPEG standard size according to the present invention comprises replacing one or more slices of the portion of the picture currently being displayed with new slices to display the new portion of the picture which is desired to be viewed. More specifically, scrolling from a first view of the compressed picture to a second view comprises the CPU 314 directing the RAM 312 to provide the new slices of the compressed picture which are part of the second view for decoding in place of slices from the first view which will no longer be displayed.

In one embodiment, the CPU 314 provides an output to a graphic on-screen display block 322. The graphic on-screen display block 322 is coupled to provide an output in conjunction with the audio/video output provided by decoder 304. The graphic on-screen display block 322 organizes data in a format which can be overlaid on top of the audio/video output of the decoder 304. Thus, the CPU 314 executes an interactive application and generates on-screen graphics which are provided in conjunction with the audio/video stream being output from the decoder 140. Thus, for example, if the interactive application is written to cause one or more images or selection options to be displayed or overlaid on top of a television program or still image, the CPU 314 executing the application provides the appropriate output to the graphic on-screen display block 322, and the block 322 causes the respective images or selection buttons to be overlaid on top of and/or displayed with the audio/video output of the decoder 304

The interactive decoder 140 also includes an input for receiving user input. This user input is provided to an input of the CPU 314. This user input may be provided from various devices, preferably from remote control 152 or from buttons on the TV 150 or the interactive decoder 140. The user input provided to the CPU 314 enables a user to interact with the interactive application. For example, the user or viewer may choose a selection or button to order a product or order information, provide answers to a television game show, etc. As another example, according to the present invention, the user may also provide scrolling input to selectively scroll in a vertical and/or horizontal fashion in compressed pictures which are larger than MPEG standard size in length or width or both.

The interactive decoder 140 also includes a modem 324 which provides information on the return channel 156 for user interactivity. As shown in FIG. 3, the CPU 314 is coupled to the modem 324, and the modem 324 is coupled to a return channel output of the interactive decoder 140. In the embodiment shown in FIG. 3, the modem 324 may be used for bi-directional communication. As shown in FIG. 1, the return channel 156 preferably couples to a transaction server 160. Thus, if the user selects an option to order information, or purchase a product, the transaction server 160 receives this order and processes the order for fulfillment. Also, if the user answers questions in a game show, the answers are provided on the return channel 156 to the transaction server 160.

FIG. 3A—Interactive Decoder Alternate Embodiment

Referring now to FIG. 3A, as noted above, in an alternate embodiment, the compressed pictures which are larger than MPEG standard size are comprised in the audiovisual content portion of the bitstream. In this embodiment, the set top box or interactive decoder 140 includes a picture buffer or memory 303 coupled between the demultiplexer 302 and the decoder 304. The picture buffer 303 may also be comprised in the decoder 304, as desired. The picture buffer 303 is operable to store portions of a compressed picture, or all of a compressed picture, to facilitate providing slices to the decoder 304 in order to accomplish scrolling in a compressed picture which is larger than MPEG standard size according to the present invention. In other words, the picture buffer 303 facilitates providing new slices from a second portion of the compressed picture desired to be viewed to replace slices from a first portion of the compressed picture to accomplish scrolling.

In this embodiment, the buffer 303 and RAM 312 may optionally exchange information as shown. This provides for the buffer 303 to transfer slices to and from the RAM 312 if storage or background manipulation is desired. In other words, should the buffer 303 receive more input from the demultiplexer 302 than the buffer 303 can store, i.e., the nonstandard MPEG picture is larger than the picture buffer 303, the buffer 303 may transfer slices or other data to the RAM 312 for storage and later retrieval. Alternatively, as discussed further below, the picture buffer 303 only stores a portion of the compressed picture, and the decoder 140 requests additional slices from the video display system based on received scrolling input.

In this embodiment, the CPU 314 also provides an output to the buffer 303, as shown. The CPU 314 uses the output to control the provision of MPEG slices to and from the buffer 303, to and from the RAM 312 and to and from the decoder 304. In other words, in FIG. 3A, the CPU 314 controls the input and output of the buffer 303 to accomplish scrolling in a compressed picture which is larger than MPEG standard size in much the same way that the CPU 314 in FIG. 3 controls the RAM 312 to provide slices to the decoder 304 to accomplish scrolling. More specifically, in FIG. 3A, scrolling in a compressed picture which is larger than MPEG standard size comprises the CPU 314 directing the buffer 303 and/or RAM 312 to provide the appropriate slices comprising the next desired portion of the compressed picture to be viewed for decoding in response to received scrolling input.

Encoding Compressed Pictures Larger than Standard MPEG Size

As discussed in the background section, MPEG-2 video bitstreams are generally comprised of some combination of I (Intra-coded) pictures, P (predictively-coded) pictures, and B (Bidirectionally-interpolated) pictures. Each of the compressed pictures which are larger than MPEG standard in size are comprised of a plurality of slices. The MPEG-2 standard defines a slice as a contiguous sequence of 2 or more macroblocks (16×16 pixel blocks) that begin and end on the same row (of macroblocks). In the preferred embodiment, only I pictures are used for encoding compressed pictures which are larger than MPEG standard size. P and B pictures are preferably not used for encoding the compressed pictures which are larger than MPEG standard size due to the inherent difficulties of creating these pictures with the proper slice structure. The header of the picture, and possibly other headers from the pieces of the picture, are stripped off and placed in memory. A pointer is preferably placed to point to the header at the location in the slice (and/or macroblock, etc. as desired) for the location of the part of the picture which is to be displayed.

To enable vertical scrolling, the simplest scenario is to encode each row of macroblocks into a slice. For a picture with MPEG standard width, but with longer length than standard MPEG, this encoded picture would resemble FIG. 4A. In this example, each row of macroblocks is encoded into a slice. One or more slices at the bottom and top of the picture are preferably independently compressed, meaning that a slice is encoded such that it can be decoded without requiring references to macroblocks in other neighboring slices. This independent encoding of slices enables scrolling to be performed, since a slice can be decoded and displayed without requiring decoding of a neighboring slice which is not being displayed. It is noted that a picture can be encoded without any slices being independently compressed. However, this may require that slices be decoded which are not being displayed. Multiple slices in the picture which are always displayed together may also be compressed together, i.e., compressed dependently, if desired.

Figure 4A:
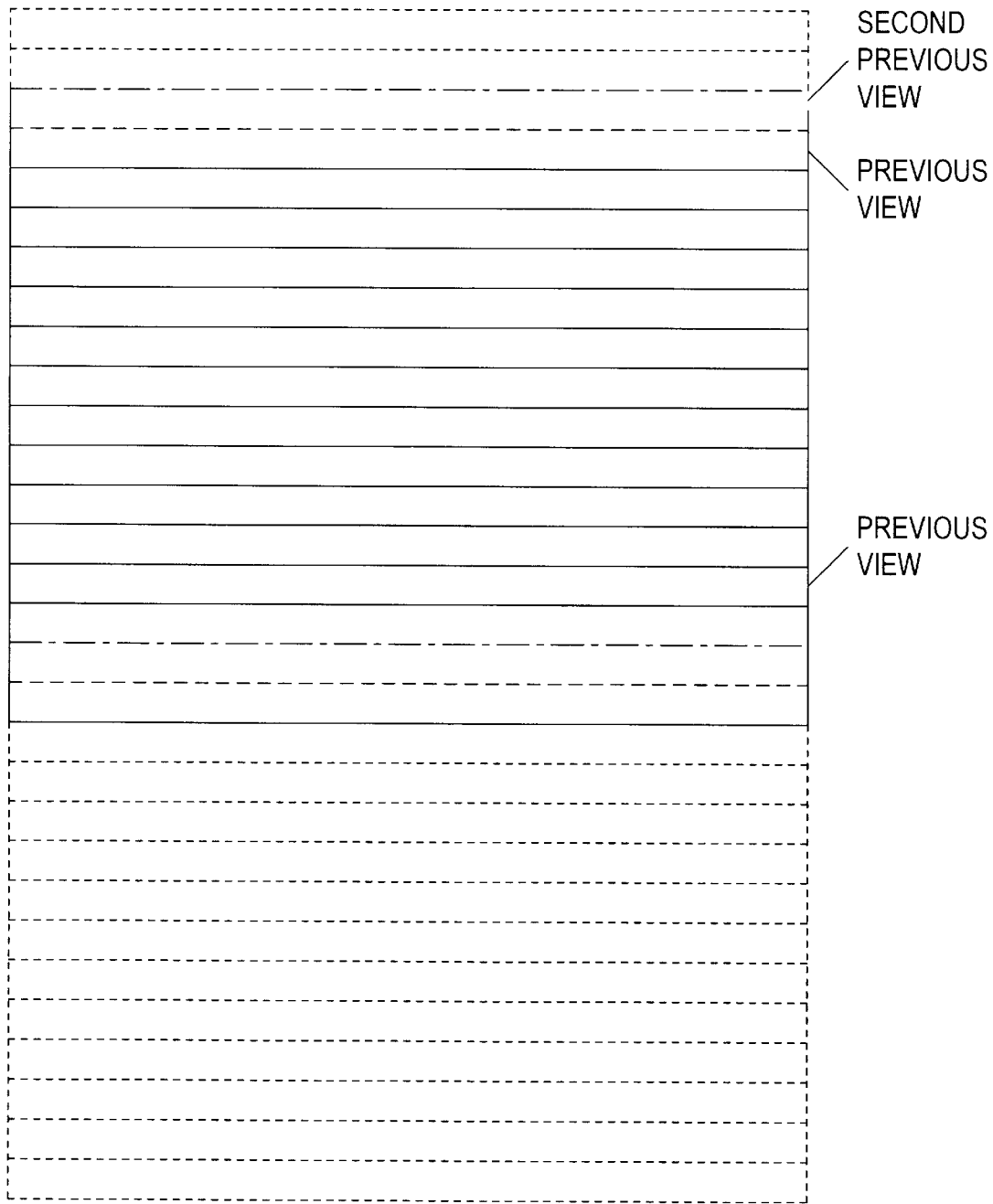
FIG. 4A illustrates a slice structure which allows vertical scrolling according to the present invention.

The following example of FIG. 4A presumes that the user can scroll down individual horizontal slices one at a time, that the initial portion of the picture displayed was at the very top of the picture, and the user has scrolled down four times or slices. In FIG. 4A, the Current View is designated by the solid lines. The Current View is the result of having scrolled down four slices from the top of the picture. The immediately previous view to the Current View, is referred to as Previous View and delimited with the uniform wide dashed lines. The immediately previous view to the Previous View, is named as Second Previous View and delimited with the alternating wide and narrow dashed lines. The first view comprising the upper leftmost portion of the picture and the second view after that are not shown.

Figure 4B:
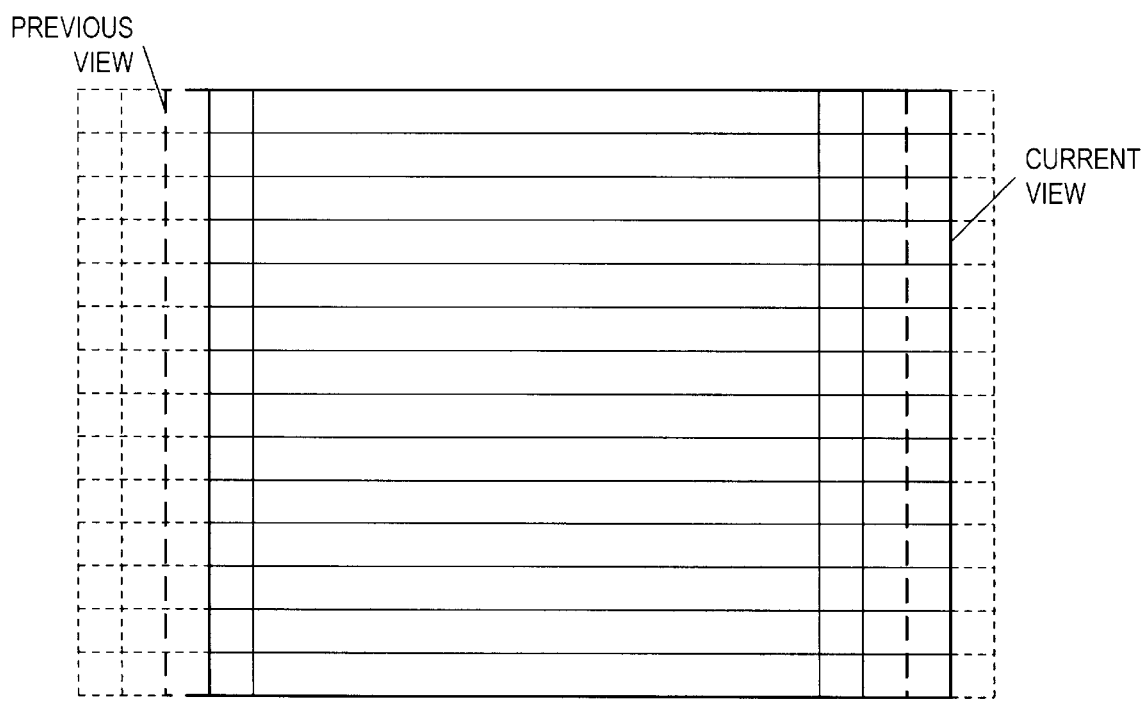
FIG. 4B illustrates a slice structure including one or more columns of slices which allow for horizontal scrolling according to the present invention.

For a picture with MPEG standard length, but with wider width than standard MPEG, this encoded picture would resemble FIG. 4B. In this example, each row of macroblocks is encoded into multiple slices. The first few slices on the left side and the right side are comprised of only the minimum two macroblocks, while the slices in the middle of the picture may be composed of more than two macroblocks. The slices on the left and right sides are made small enough and independently compressed such that an MPEG standard size portion of the compressed picture is always available for independent decoding and viewing. In other words, if the compressed picture is, for example, 16 macroblocks wider than MPEG standard, then in this example there are at least four minimum sized slices of two macroblocks each on both the left and right sides of the picture, along with a set of possibly larger slices in the middle to allow for scrolling completely across the compressed picture from left to right and back. In FIG. 4B, the Current View is designated by the solid lines. The Current View is the result of having scrolled right once from the Previous View, delimited with wide dashed lines.

Figure 4C:
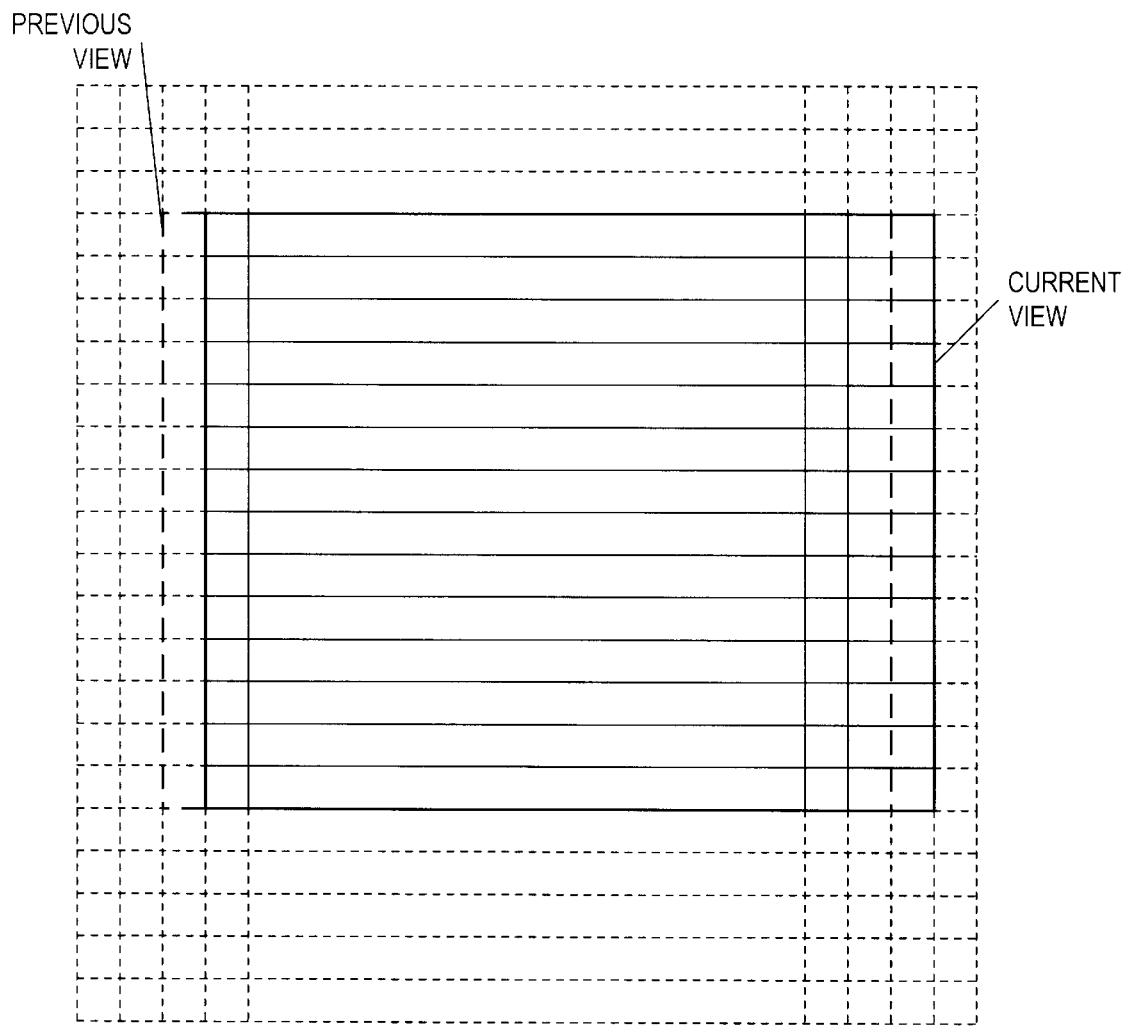
FIG. 4C illustrates a slice structure similar to FIG. 4B including one or more columns of slices according to the present invention, wherein both vertical scrolling and horizontal scrolling are possible.

Alternatively, if the picture is larger than MPEG standard in both length and width, a picture preferably is encoded with the slice structure similar to that shown in FIG. 4C. In this case, the first few slices on the left side and the right side may be comprised of only the minimum two macroblocks, while the slices in the middle of the picture may be composed of more than two macroblocks. As described above, the slices on the left and right sides are made small enough and independently compressed such that an MPEG standard size portion of the compressed picture is always available for independent decoding and viewing. The slice structure of FIG. 4C also allows for vertical scrolling of the picture. In FIG. 4C, the Current View is designated by the solid lines. The Current View is the result of having scrolled right once from the Previous View, delimited with wide dashed lines.

Figure 5:
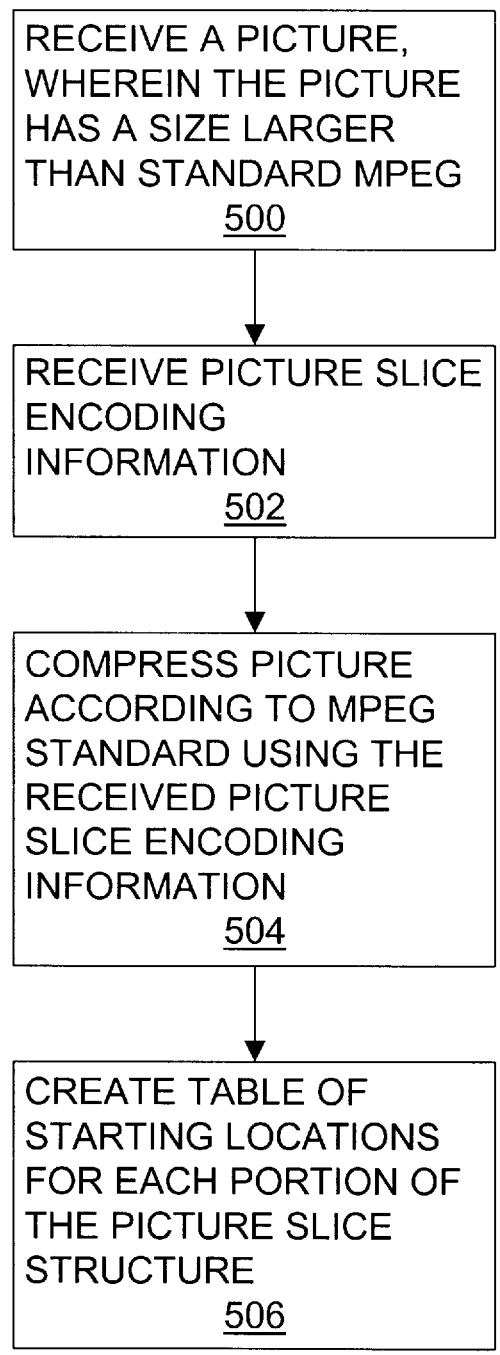
FIG. 5 is a flowchart diagram illustrating the creation of a compressed file or picture using a predetermined slice structure.

FIG. 5—Encoding Operation of the Preferred Embodiment

Referring now to FIG. 5, a flowchart diagram is shown illustrating operation of the preferred embodiment of the present invention in creating an encoded MPEG picture larger than standard MPEG size which can be scrolled. FIG. 5 illustrates the preferred embodiment, it being noted that the present invention may be implemented in various other ways. Although the method is shown in flowchart form, it is noted that certain of the steps in FIGS. 5 and 6 may occur concurrently or in different orders.

As discussed above, the present invention comprises a system and method for scrolling in a picture which is larger than MPEG standard size in a video delivery system, preferably in an interactive television system. The interactive television system comprises a video delivery system for providing video content, and at least one subscriber television including a display screen, wherein the subscriber television is coupled to the video delivery system. The present invention also includes a system and method for encoding a compressed picture with a proper slice structure for scrolling.

The flowchart of FIG. 5 shows how a picture larger than MPEG standard size is slice encoded and compressed for transmission to a subscriber television through a video delivery system. The flowchart of FIG. 5 also shows how any desired tables comprising the starting points of slices are created along with the slice encoding. As shown in FIG. 5, the method preferably operates as follows.

In step 500 encoder 106 or a similarly fluctional device receives an uncompressed picture which is preferably larger than MPEG standard size, i.e., larger than standard MPEG length or width or both. The MPEG compression standard is preferably used as the reference standard for size, but other compression standards or methodologies could be used as desired, such as TIFF (Tagged Image File Format) among others. When another compression standard or methodology is used, the reference size would preferably be the size of a displayable image or the size of the portion of the image that would be desirable to view at any one time, instead of the MPEG standard size. When other compression standards or methodologies are used, the term "slice" shall mean a portion of the picture to be compressed which may be independently compressed by that standard or methodology.

In step 502 encoder 106 or a similarly functional device receives picture slice encoding information. In the preferred embodiment, the picture slice encoding information comprises such information as how and where to create slices in the uncompressed picture, and which slices must be independently compressed. This slice structure is preferably designed to allow for scrolling in the picture such that all possible portions of the picture can be viewed on the subscriber television. In other words, the picture slice encoding information preferably includes enough information to allow encoder 106 to encode the uncompressed picture with a slice structure which has enough divisions to allow for smooth scrolling through the entire picture once the picture is compressed, transmitted, received and the desired portions of the picture are uncompressed.

The picture slice encoding information may include a certain scrolling granularity which indicates the number of consecutive slices that are scrolled at one time. The number of consecutive slices that are scrolled at one time means that each scrolling input results in a jump of a set number of slices. This granularity can be accomplished by compressing blocks of slices independently, to a set number of slices compressed dependently together when the picture is MPEG compressed. This granularity can also be accomplished by the interactive application being programmed to cause each scrolling input to result in a jump or scroll a number of slices, even if the slices are each independently compressed. For example, consider a picture (not shown) which is MPEG standard width and is much longer than MPEG standard length. With a one row granularity, a single viewer input to scroll down in the image of this picture results in a single slice being removed from the top of the previous image with a single new slice added to the bottom of the previous image to form a new viewable image. Scrolling from the top to the bottom of this picture then requires many scrolling inputs. With a larger granularity, such as 4 slices, viewer input to scroll down in the image of this picture results in 4 slices being replaced at the top of the previous image with an identical number of new slices at the bottom of the previous image to form a new viewable image. Scrolling from the top to the bottom of the picture then requires fewer scrolling inputs. The number of multiple slices being scrolled is preferably controllable by the system and/or the user.

In step 504 encoder 106 or a similarly functional device compresses the uncompressed picture according to the picture slice encoding information. Preferably the compression method is the MPEG standard method, although it will be appreciated by ones skilled in the art that other compression schemes are contemplated, as mentioned above. If the picture being compressed has a length or width which conforms to the MPEG standard, for example, then the encoded slices or groups of slices which make up the picture preferably likewise conform to the MPEG standard in length or width.

Preferably, encoder 106 or a similarly functional device creates a table of starting points for each portion of the picture slice structure, as shown in step 506. While it would be possible for a decoder to search the slice structure for the starting locations of any given slice or group of slices, preferably a jump table is created, allowing for the starting point of any slice to be known without a search.

Stated another way, the operation of compressing a picture larger than MPEG standard size, such that the compressed picture can be scrolled on a screen, preferably comprises an encoder receiving an uncompressed picture and picture slice encoding information. The encoder preferably then independently compresses slices or groups of slices according to the MPEG standard such that the compressed picture can be scrolled in a display. The encoder then preferably creates a table of starting points for each slice or group of slices which has been independently compressed and/or which are scrollable.

Figure 6:
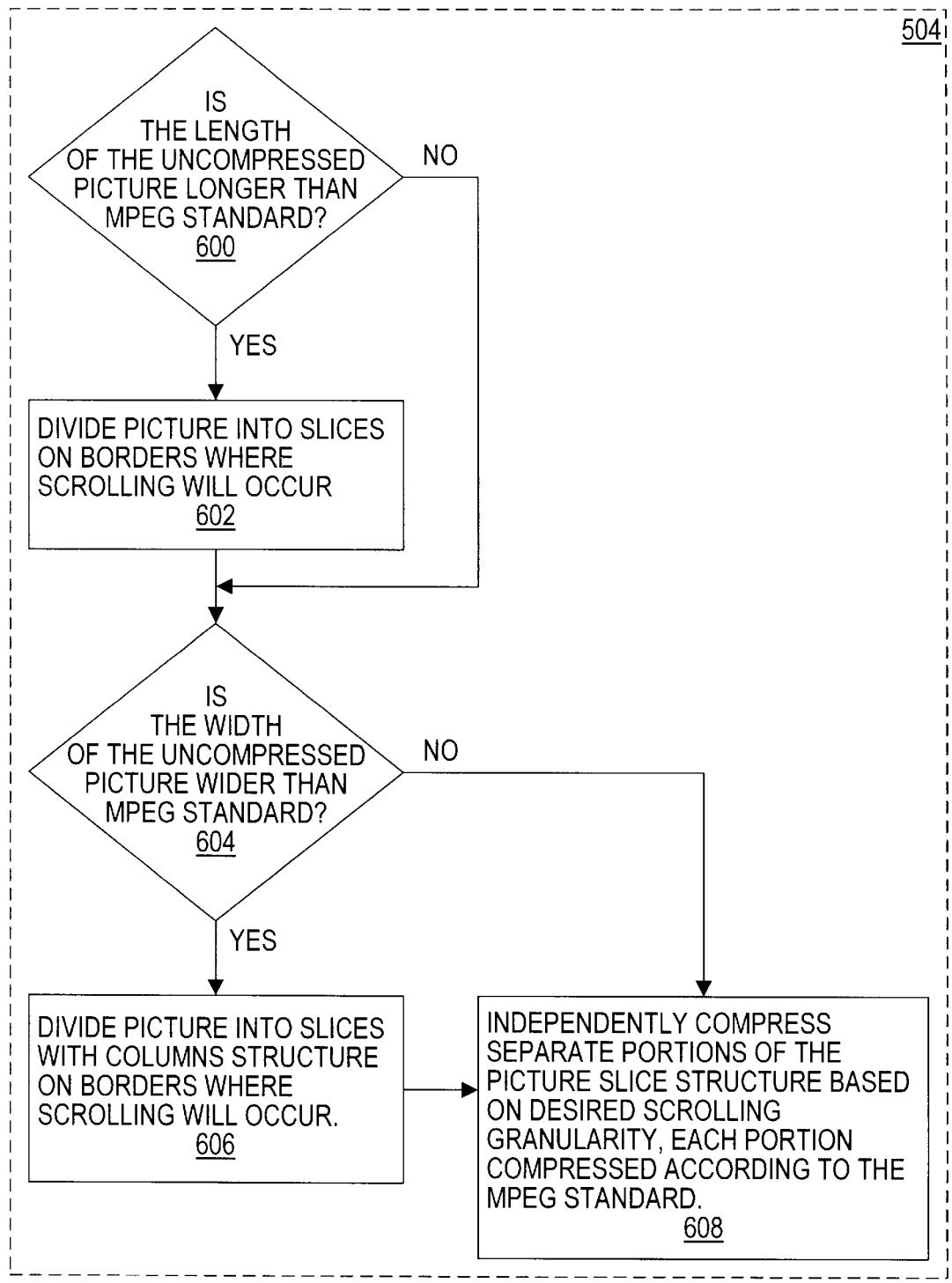
FIG. 6 is a flowchart diagram illustrating the encoding step of FIG. 5 according to the present invention.

FIG. 6—Compressing a Non-Standard Sized Picture

Referring now to FIG. 6, a flowchart diagram is shown conceptually illustrating step 504 of compressing the uncompressed picture according to the picture slice encoding information. It is noted that the flowchart of FIG. 6 is primarily conceptual, and the steps of FIG. 6 may occur in various order or be implemented in different ways. As shown, step 504 generally comprises the following steps. First, in step 600, the method compares the length of the uncompressed picture to the length allowed by the MPEG standard. If the uncompressed picture is longer than MPEG standard, the method proceeds to step 602. In step 602 the method preferably divides the uncompressed picture into slices and/or slice groups for independent compression on top and bottom borders to enable vertical scrolling to occur. The picture slice encoding information from step 502 is preferably used to decide where borders and scrolling boundaries will occur.

In the next step 604, the method compares the width of the uncompressed picture to the width allowed by the MPEG standard. If the uncompressed picture is wider than MPEG standard, the method proceeds to step 606. In step 606, the method preferably divides the slice structure into columns of slices on the left and right borders where horizontal scrolling may occur. The final step 608 involves compressing the slices according to the MPEG standard. In step 608, the method preferably independently compresses each individual slice or groups of slices, depending on the desired scrolling granularity. If groups of slices are present which would never scroll out of the viewing area, those groups of slices may be compressed together as desired. It is noted that steps 602, 604 and 606 are generally performed together as an encoding operation.

Therefore, the operation of the video delivery system or cable head-end can be summarized as follows. First a picture or image is selected. The picture has a size which may be larger than standard MPEG in length or width or both. Picture slice encoding information is then created for the picture bitstream, preferably using the dimensions of the MPEG standard as a reference.

A software encoder, which accepts the picture slice encoding information, is used to encode the picture. A mutliplexed signal is then created comprising: a) an interactive application to perform all necessary operations, including scrolling; b) the compressed picture bitstreams; c) any desired additional picture bitstreams; and d) any desired slice maps or byte offsets into the additional picture bitstreams. This multiplexed stream can then be transmitted to one or more subscriber televisions.

Figure 7:
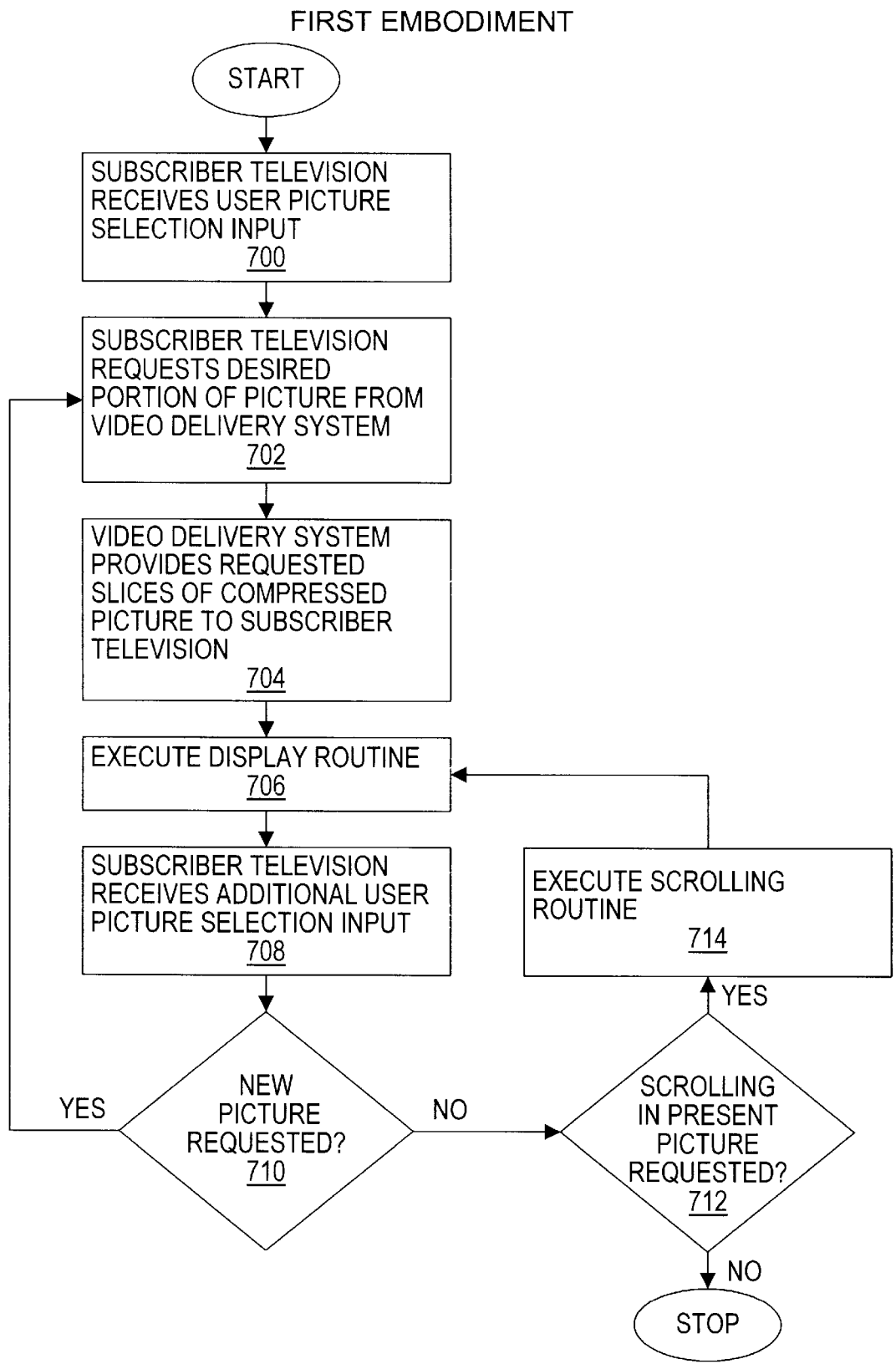
FIG. 7 is a flowchart diagram illustrating the process of viewing a compressed picture with a subscriber television having reduced memory requirements according to the present invention.

FIG. 7—Scrolling in a Portion of a Compressed Picture

Referring now to FIG. 7, a flowchart diagram is shown illustrating a method for scrolling in a compressed picture larger than MPEG standard size according to a first embodiment of the present invention. It is noted that the flowchart of FIG. 7 is primarily conceptual, and the steps of FIG. 7 may occur in various orders or be implemented in different ways.

The method of FIG. 7 is illustrated with respect to the compressed picture being transferred to a subscriber television from a video delivery system for viewing. In step 700 the subscriber television receives some type of user input selecting a picture for viewing. Here it is presumed that user input is received which selects a picture which is larger than standard MPEG size. In response to step 700, the subscriber television in step 702 requests the picture, or the initial or default portion of the picture, preferably the upper leftmost portion of the picture or the default view of the picture, from the video delivery system. It is noted that the subscriber television may initially simply request the picture, and the video display system may be configured to initially only provide the default portion or default slices.

In response to step 702, the video delivery system in step 704 provides the requested slices of the compressed picture to the subscriber television. In this example, the picture chosen by user input is larger than standard MPEG size and compressed according to the present invention. The picture is compressed so that the requested slices allow the subscriber television to scroll through the compressed picture, as will be described in the following steps of the method. Upon receiving the requested slices in step 704, the subscriber television displays the desired portion of the compressed picture in step 706. Further detail of step 706 is given below in the description of FIG. 9.

The subscriber television continuously displays the image of the requested picture displayed in step 706 until the subscriber television receives additional user picture selection input in step 708. In step 708 the subscriber television receives a new input from the user regarding which picture or portion of a picture is desired to be viewed, i.e., whether a new picture is desired or scrolling within a current picture is desired. In response to the received input in step 708, the method determines if a new picture is being requested by the user in step 710. This new picture would be a picture different from the picture currently being displayed by the subscriber television in step 706. For example, the new picture might be chosen from a link in the current picture being displayed or might simply be a picture requested when the user issues a command to the subscriber television to display a different picture, such as by changing a channel on a standard broadcast television.

In step 710, if the method determines that a new, different picture has been requested, the method returns to step 702 and requests that the video delivery system provide the new picture.

Alternatively, if the user in step 708 has requested scrolling in the present picture by providing scrolling input as determined in step 712, then operation advances to step 714. For example, if the picture being viewed is wider than MPEG standard, the user may input a command to scroll left or right in the image in order to view another portion of the picture. If the picture being viewed is longer than MPEG standard, the user may input a command to scroll up or down in the image in order to view another portion of the picture.

For a picture which has a length or width or both in conformance with the MPEG standard, scrolling for that respective direction is preferably disabled, unless the image has been enlarged on the screen and the image is then larger than that dimension of the viewing screen.

Scrolling, whether vertical or horizontal or both, is performed in step 714 as described in the next section. The result of the scrolling routine performed in step 714 is to set up new slices in the memory corresponding to the portion of the picture desired to be viewed. In other words, the scrolling routine uses the scrolling input received from the user to obtain the appropriate slices. The scrolling routine also preferably uses the slice table starting location to request the appropriate slices. In response to the execution of the scrolling routine in step 714, the method returns to the display routine in step 706 to display the desired portion of the picture indicated by the scrolling input. The display routine operator transfers the slices from memory to the decoder for viewing.

Figure 8:
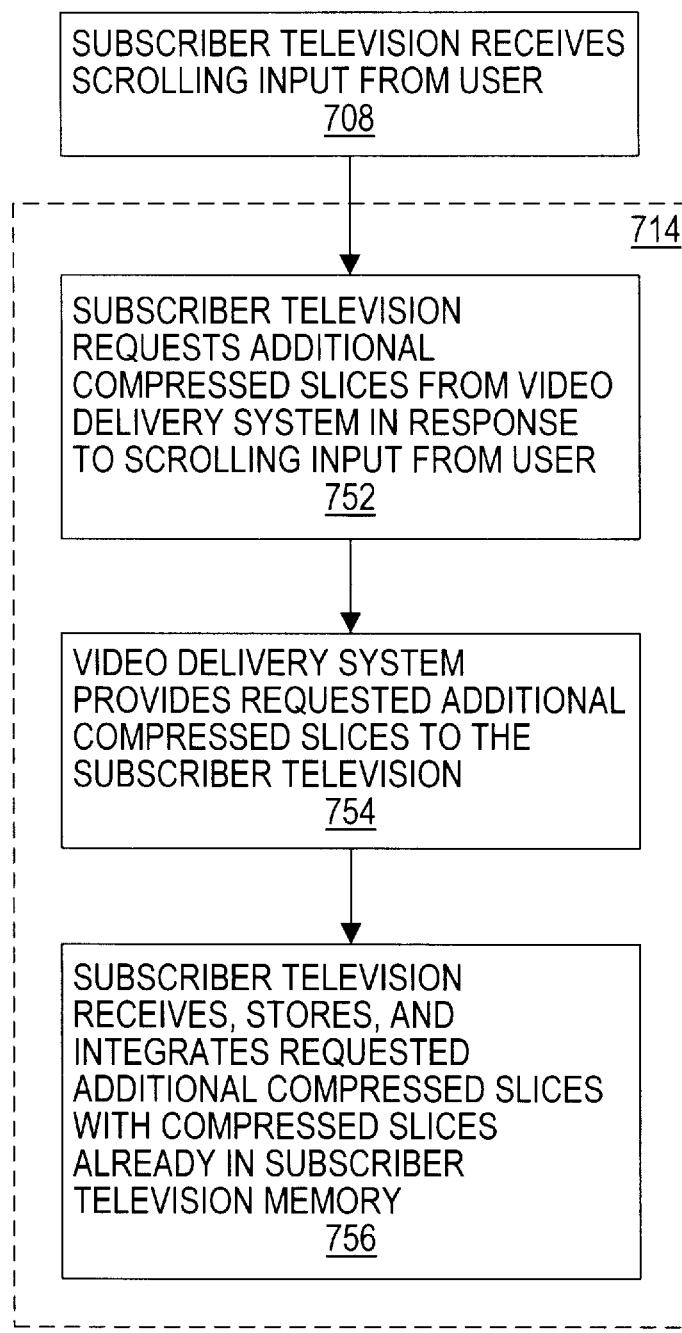
FIG. 8 is a flowchart diagram illustrating the process of scrolling in a compressed picture with a subscriber television having reduced memory requirements according to the present invention.

FIG. 8—Scrolling Routine

Referring now to FIG. 8, a flowchart diagram illustrating the scrolling routine performed in step 714 of FIG. 7 is shown. It is noted that the flowchart of FIG. 8 is primarily conceptual, and the steps of FIG. 8 may occur in various orders or be implemented in different ways. Step 714 may be broken down into steps 752–756. In step 708, the subscriber television receives scrolling input from the user. Step 708 corresponds to step 708 of FIG. 7 where the user has provided scrolling input. The scrolling input indicates that the user presumably wishes to view another portion of the current picture which is not presently shown on the subscriber television. The desired portion of the picture to be viewed may be above, below, to the left or to the right of the currently viewed portion of the picture. For example, if the image currently being displayed by the subscriber television is the upper leftmost portion of the picture, the user may request that the picture be scrolled down the picture's length or to the right along the picture's width or a combination of the two. Obviously if the picture has a standard MPEG width, but a larger length than MPEG standard, the user can only scroll up or down. Likewise if the picture has a standard MPEG length, but a larger width than MPEG standard, the user can only scroll left or right.

In the preferred embodiment, the subscriber television does not or may not have enough memory in the RAM 312 or picture buffer 303 to store all portions of the picture in the subscriber television memory. In response to scrolling input in step 708, the method in step 752 requests the additional compressed slices from the video delivery system so that the picture may be scrolled as requested by the user.

In response to step 752, the video delivery system in step 754 provides the requested additional compressed slices to the subscriber television. Upon receiving the additional compressed slices requested in step 754, in step 756 the subscriber television stores the received additional compressed slices, possibly replacing in RAM 312 or the picture buffer 303 those slices no longer needed for display. In step 756 the subscriber television integrates the received additional compressed slices with those already stored in memory by the subscriber television. The subscriber television preferably uses the slice map or table to aid in requesting and/or integrating the slices.

Figure 9:
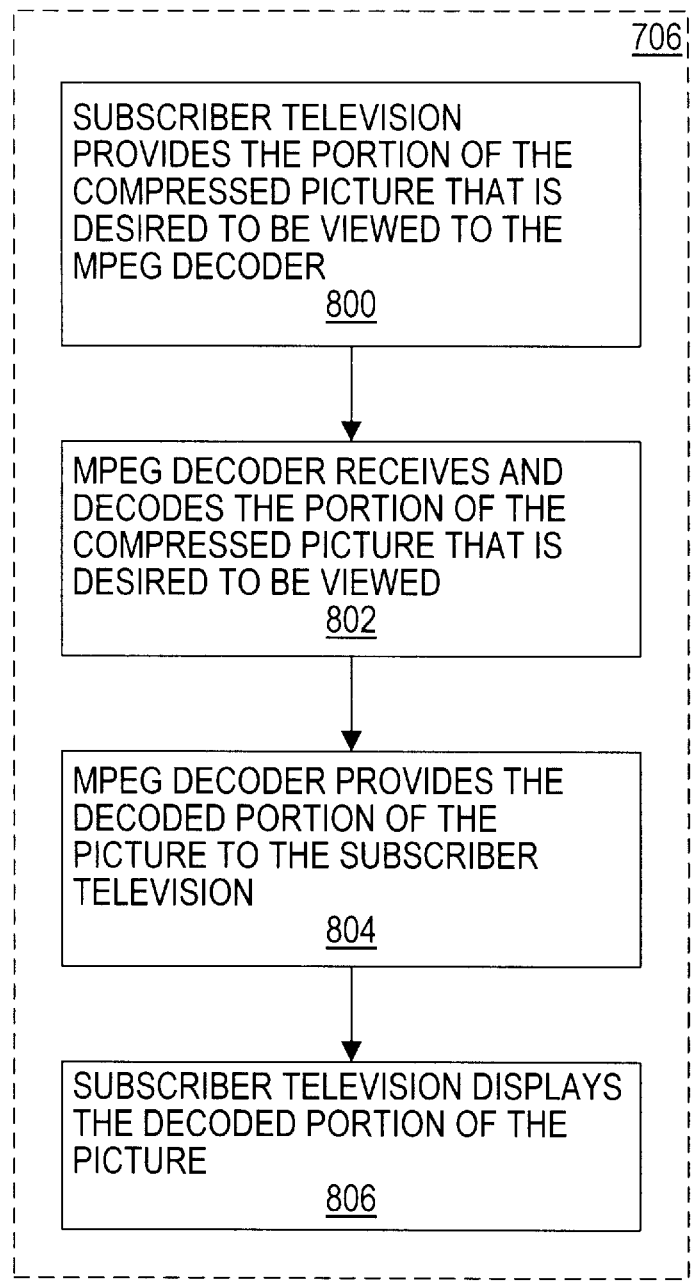
FIG. 9 is a flowchart diagram illustrating the display routine of FIGS. 7 and 10 according to the present invention.

FIG. 9—Displaying a Portion of a Compressed Picture

Referring now to FIG. 9, a flowchart diagram illustrating the display routine performed in step 706 of FIG. 7 is shown. It is noted that the flowchart of FIG. 9 is primarily conceptual, and the steps of FIG. 9 may occur in various order or be implemented in different ways. Step 706 may be broken down into the following steps. In step 800 the subscriber television provides the portion of the compressed picture that is desired by the user to be viewed to the MPEG decoder. The portion provided comprises a plurality of slices having a size corresponding to a standard MPEG size. In response to step 800, in step 802 the MPEG decoder receives the slices and decodes the portion of the compressed picture which is desired to be viewed.

In step 804 the MPEG decoder provides the decoded portion of the picture to the subscriber television. In response to step 804, in step 806 the subscriber television displays the decoded portion of the picture. The subscriber television may continuously display the image of the decoded portion of the picture until another image is desired to be viewed.

Figure 10:
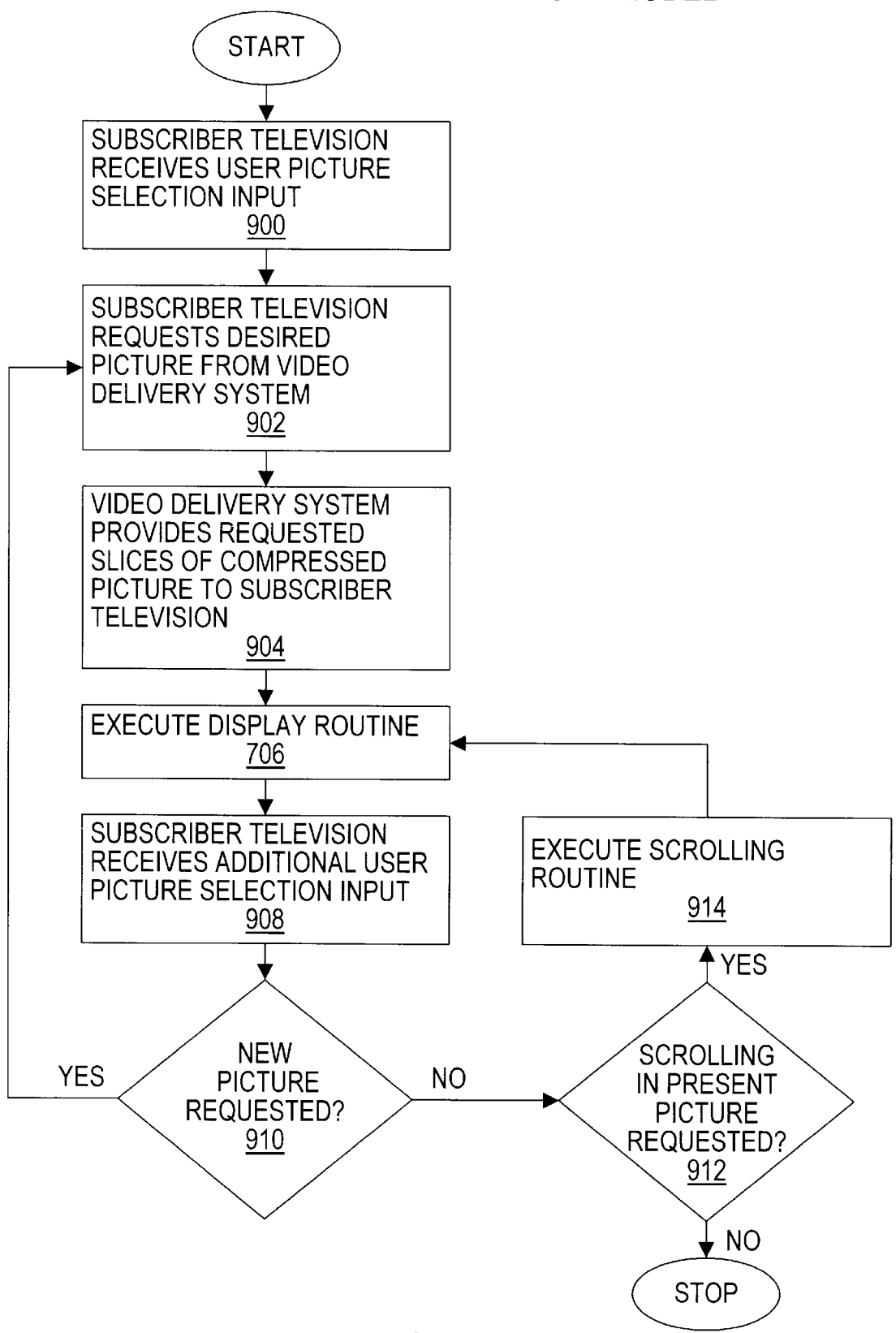
FIG. 10 is a flowchart diagram illustrating the process of viewing a compressed picture with a subscriber television having sufficient memory to store the entire scrollable picture according to the present invention.

FIG. 10—Scrolling in a Compressed Picture

Referring now to FIG. 10, a flowchart diagram illustrating a method is shown for scrolling in a compressed picture larger than MPEG standard size according to another embodiment. FIG. 10 illustrates an embodiment similar to the embodiment of FIG. 7, and includes an additional feature wherein the subscriber television can store one or more entire pictures in memory at the same time. Thus, in this embodiment, the subscriber television is not required to request that other slices of a picture be provided by the video delivery system when other scrolling input is received, but rather all of the slices of a picture are present in memory. It is noted that the flowchart of FIG. 10 is primarily conceptual, and the steps of FIG. 10 may occur in various orders or be implemented in different ways. The method is illustrated with respect to the compressed picture being transferred to a subscriber television from a video delivery system for viewing. The method starts when the subscriber television receives user input selecting a picture for viewing in step 900. In response to step 900, the subscriber television in step 902 preferably requests the desired compressed picture for viewing from the video delivery system.

In response to step 902, the video delivery system in step 904 preferably provides all of the slices comprising the requested compressed picture to the subscriber television. The compressed picture is compressed with a slice structure according to the present invention which enables the user to scroll the compressed picture, as will be described in the following steps of the method. Upon receiving the requested slices in step 904, the subscriber television displays a default portion of the compressed picture in step 706, preferably the upper leftmost portion of the picture. Further detail of step 706 is given in the description of FIG. 9.

The subscriber television may continuously display the image of the requested picture displayed in step 706 until such time as the subscriber television receives additional user picture selection input in step 908. In other words, in step 908, the subscriber television receives a new input from the user regarding which picture or portion of a picture is desired to be viewed. In response to step 908, the method determines if a new picture is being requested by the user in step 910. A new picture is a picture different from the picture currently being displayed by the subscriber television as part of step 706. For example, the new picture might be chosen from a link in the current picture being displayed or might simply be a picture requested when the user issues a command to the subscriber television to display a different picture, such as by changing a channel on a standard broadcast television.

If the method in step 910 determines that a new, different picture has been requested, the method returns to step 902 and requests that the video delivery system provide the new picture. Alternatively, the method moves to step 912. In step 912, the method determines if the user in step 908 has requested scrolling in the present picture by providing scrolling input. For example, if the picture being viewed is wider than MPEG standard, the user may input a command to scroll left or right in the image in order to view another portion of the picture. If the picture being viewed is longer than MPEG standard, the user may input a command to scroll up or down in the image in order to view another portion of the picture. For those pictures which have a length or width or both in conformance with the MPEG standard, scrolling is preferably disabled unless the image has been enlarged on the screen and the image is then larger than the dimension of the viewing screen. Scrolling whether vertical or horizontal or both, is carried out in step 914 described with reference to FIG. 11. In response to the execution of the scrolling routine in step 914, the method returns to the display routine in step 706. The display routine in step 706 execution is described above with reference to FIG. 9.

Figure 11:
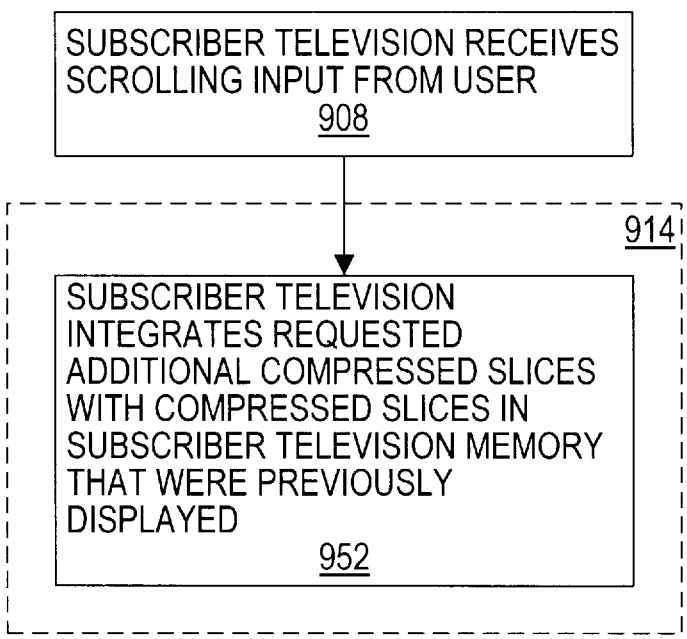
FIG. 11 is a flowchart diagram illustrating the process of scrolling in a compressed picture with a subscriber television having sufficient memory to store the entire scrollable picture according to the present invention.

FIG. 11—Scrolling Routine

In the embodiment of FIG. 10, the subscriber television has additional memory beyond the minimal amount present in the embodiment described in FIGS. 7 and 8. This scrolling method described herein does not require additional slices from the video delivery system for scrolling to occur. It is noted that the flowchart of FIG. 11 is primarily conceptual, and the steps of FIG. 11 may occur in various order or be implemented in different ways.

Referring now to FIG. 11, step 914 may be broken down into the following steps. In step 908, the subscriber television receives scrolling input from the user. The scrolling input indicates that the user wishes to view another portion of the current picture which is not presently shown on the subscriber television. The desired portion of the picture to be viewed may be above, below, to the left or to the right of the currently viewed portion of the picture. For example, if the image currently being displayed by the subscriber television is the upper leftmost portion of the picture, the user may request that the picture be scrolled down the picture's length or to the right along the picture's width or a combination of the two.

In the preferred embodiment, the subscriber television has sufficient memory to store the entire picture in the subscriber television memory. In response to the scrolling input received in step 908, the method in step 952 integrates the necessary additional compressed slices for scrolling in the desired manner with those previously displayed by the subscriber television. A pointer points to the starting address in memory of each slice. Integration involves combining the set of pointers from the previous view with those additional pointers needed to provide the next desired view, while removing those pointers from the set which indicate slices in the previous view which are no longer needed for the next desired view.

As noted above, the table of starting points for each slice is preferably created to aid the subscriber television in more easily scrolling in a larger than standard compressed picture. Where the table of starting points for each slice is not created and provided to the subscriber television, then the subscriber television is required to perform more processing to complete the slice starting points and hence properly scroll the larger than standard picture.

Conclusion

Therefore, the present invention comprises an improved system and method for scrolling in a compressed picture which is larger than MPEG standard in length or width or both. Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A method for scrolling through a picture in an interactive television system, wherein the interactive television system comprises a video delivery system for providing video content, and at least one subscriber television including a display screen, wherein the subscriber television is coupled to the video delivery system, the method comprising:

the video delivery system providing at least a portion of a compressed picture, wherein said compressed picture comprises a plurality of slices, wherein at least a subset of said plurality of slices are independently compressed, wherein said compressed picture has a size greater than a standard MPEG picture;

the subscriber television receiving said at least a portion of said compressed picture;

the subscriber television receiving scrolling input from a user indicating a portion of said picture which is desired to be viewed;

the subscriber television providing a subset of said plurality of slices to an MPEG decoder in response to said scrolling input, wherein said subset of said plurality of slices correspond to said portion of said picture which is desired to be viewed;

the subscriber television decoding said subset of said plurality of slices to produce said portion of said picture which is desired to be viewed;

the subscriber television displaying said portion of said picture after said decoding.

2. The method of claim 1, wherein said compressed picture is a compressed MPEG I picture.

3. The method of claim 1, wherein said subset of said plurality of slices corresponding to said portion of said picture which is desired to be viewed is a standard MPEG size.

4. The method of claim 3, wherein said compressed picture has a length which is greater than a standard MPEG picture length, wherein said scrolling input indicating said portion of said picture which is desired to be viewed indicates a portion of said length of said compressed picture.

5. The method of claim 4, wherein said compressed picture has a width which is equal to a standard MPEG picture width, wherein said plurality of slices each have a width corresponding to said standard MPEG picture width.

6. The method of claim 4, wherein said compressed picture has a width which is greater than a standard MPEG picture width, wherein said compressed picture further comprises a plurality of columns of slices; wherein said scrolling input indicating said portion of said picture which is desired to be viewed indicates a portion of said width of said compressed picture.

7. The method of claim 3, wherein said compressed picture has a width which is greater than a standard MPEG picture width, wherein said compressed picture further comprises a plurality of columns of slices; wherein said scrolling input indicating said portion of said picture which is desired to be viewed indicates a portion of said width of said compressed picture.

8. The method of claim 7, wherein said compressed picture has a length which is equal to a standard MPEG picture length, wherein each of said plurality of columns of slices have a length corresponding to said standard MPEG picture length.

9. The method of claim 1, further comprising:
the subscriber television displaying a default portion of said at least a portion of said compressed picture, after said receiving said at least a portion of said compressed picture, wherein said default portion is a standard MPEG size.

10. The method of claim 9, wherein said displaying said default portion includes providing a first plurality of slices to the MPEG decoder wherein said subject of said plurality of slices corresponding to said portion of said picture desired to be viewed includes one or more of said first plurality of slices and includes one or more second slices.

11. The method of claim 1, further comprising:
the video delivery system providing one or more slices of said compressed picture in response to said received scrolling input, wherein said one or more slices correspond to said portion of said picture which is desired to be viewed;
the subscriber television receiving said one or more slices after the video delivery system providing said one or more slices;
wherein said providing said subset of said plurality of slices to the MPEG decoder includes providing said one or more slices which were provided in response to said received scrolling input.

12. The method of claim 1,
wherein the video delivery system providing at least a portion of said compressed picture comprises providing a first plurality of slices of said compressed picture, wherein said first plurality of slices form said at least a portion of said compressed picture;
wherein said portion of said picture which is desired to be viewed includes second one or more slices which are not included in said first plurality of slices;
the method further comprising:
the video delivery system providing said second one or more slices of said compressed picture in response to said received scrolling input, wherein said second one or more slices correspond to said portion of said picture which is desired to be viewed;
the subscriber television receiving said second one or more slices after the video delivery system providing said second one or more slices;
wherein said providing said subset of said plurality of slices to the MPEG decoder includes providing said second one or more slices which were provided in response to said received scrolling input.

13. The method of claim 12, wherein said providing said subset of said plurality of slices to the MPEG decoder includes providing at least a subset of said first plurality of slices and providing said second one or more slices which were provided in response to said received scrolling input.

14. The method of claim 1,
wherein the video delivery system providing at least a portion of a compressed picture comprises the video delivery system providing an entire picture, wherein said entire picture has a size greater than a standard MPEG picture;
wherein the subscriber television receiving said at least a portion of said compressed picture comprises receiving said entire picture and storing said entire picture in a memory;
wherein said providing said subset of said plurality of slices to the MPEG decoder in response to said scrolling input comprises providing said subset of said plurality of slices from the memory to the MPEG decoder.

15. The method of claim 1, further comprising:
the video delivery system providing a table indicating starting points of each of said plurality of slices comprising said compressed picture; and
the subscriber television receiving said table indicating starting points of each of said plurality of slices at least a portion of said compressed picture;
wherein said providing said subset of said plurality of slices to the MPEG decoder includes using said table to determine starting points of said subset of said plurality of slices.

16. The method of claim 1, further comprising:
the subscriber television receiving second scrolling input from a user indicating a second portion of said picture which is desired to be viewed;
providing a second subset of said plurality of slices to the MPEG decoder in response to said second scrolling input, wherein said second subset of said plurality of slices correspond to said second portion of said picture which is desired to be viewed;
decoding said second subset of said plurality of slices to produce said second portion of said picture which is desired to be viewed;
the subscriber television displaying said second portion of said picture after said decoding.

17. The method of claim 1,
wherein the video delivery system providing at least a portion of a compressed picture further comprises the video delivery system providing all of the slices of said compressed picture;
wherein the subscriber television receiving said at least a portion of said compressed picture further comprises the subscriber television receiving all of the slices of said compressed picture.

18. The method of claim 1,
wherein the video delivery system providing at least a portion of said compressed picture comprises providing a first plurality of slices of said compressed picture, wherein said first plurality of slices form said at least a portion of said compressed picture; and
wherein the video delivery system providing at least a portion of said compressed picture further comprises providing a second plurality of slices of said compressed picture, wherein said second plurality of slices are not included in said first plurality of slices; and
wherein said portion of said picture which is desired to be viewed includes one or more slices which are not included in said first plurality of slices;
wherein said providing said subset of said plurality of slices to the MPEG decoder includes providing said includes said one or more slices which are not included in said first plurality of slices, wherein said one or more slices which are not included in said first plurality of slices are included in said second plurality of slices of said compressed picture.

19. A method for scrolling through a picture in an interactive television system, wherein the interactive television system comprises a video delivery system for providing video content, and at least one subscriber television including a display screen, wherein the subscriber television is coupled to the video delivery system, the method comprising:

the video delivery system providing a compressed picture, wherein said compressed picture comprises a plurality of slices, wherein at least a subset of said plurality of slices are independently compressed, wherein said compressed picture has a size greater than a standard MPEG picture;

the video delivery system providing a table indicating starting points of each of said plurality of slices;

the subscriber television receiving said compressed picture and said table;

the subscriber television receiving scrolling input from a user indicating a portion of said picture which is desired to be viewed;

providing a subset of said plurality of slices to the MPEG decoder in response to said scrolling input, wherein said a subset of said plurality of slices correspond to said portion of said picture which is desired to be viewed;

decoding said subset of said plurality of slices to produce said portion of said picture which is desired to be viewed;

the subscriber television displaying said portion of said picture after said decoding.

20. The method of claim 19, wherein said compressed picture is a compressed MPEG I frame.

21. The method of claim 20, wherein said portion of said picture which is desired to be viewed is a standard MPEG size.

22. The method of claim 21, wherein said compressed picture has a length which is greater than a standard MPEG picture length, wherein said scrolling input indicating said portion of said picture which is desired to be viewed indicates a portion of said length of said compressed picture.

23. The method of claim 22, wherein said compressed picture has a width which is equal to a standard MPEG picture width, wherein said plurality of slices each have a width corresponding to said standard MPEG picture width.

24. The method of claim 22, wherein said compressed picture has a width which is greater than a standard MPEG picture width, wherein said compressed picture further comprises a plurality of columns of slices; wherein said scrolling input indicating said portion of said picture which is desired to be viewed indicates a portion of said width of said compressed picture.

25. The method of claim 21, wherein said compressed picture has a width which is greater than a standard MPEG picture width, wherein said compressed picture further comprises a plurality of columns of slices; wherein said scrolling input indicating said portion of said picture which is desired to be viewed indicates a portion of said width of said compressed picture.

26. The method of claim 25, wherein said compressed picture has a length which is equal to a standard MPEG picture length, wherein said plurality of columns of slices have a length corresponding to said standard MPEG picture length.

27. The method of claim 19, further comprising:

the subscriber television receiving second scrolling input from a user indicating a second portion of said picture which is desired to be viewed;

providing a second subset of said plurality of slices to the MPEG decoder in response to said second scrolling input, wherein said second subset of said plurality of slices correspond to said second portion of said picture which is desired to be viewed;

decoding said second subset of said plurality of slices to produce said second portion of said picture which is desired to be viewed;

the subscriber television displaying said second portion of said picture after said decoding.

28. A method for scrolling through a picture in an interactive television system, wherein the interactive television system comprises a video delivery system for providing video content, and at least one subscriber television including a display screen, wherein the subscriber television is coupled to the video delivery system, the method comprising:

the video delivery system providing at least a portion of a compressed picture, wherein said compressed picture comprises a plurality of slices, wherein at least a subset of said plurality of slices are independently compressed;

the subscriber television receiving said at least a portion of said compressed picture;

the subscriber television receiving scrolling input from a user indicating a portion of said picture which is desired to be viewed;

providing a subset of said plurality of slices to a decoder in response to said scrolling input, wherein said subset of said plurality of slices correspond to said portion of said picture which is desired to be viewed;

decoding said subset of said plurality of slices to produce said portion of said picture which is desired to be viewed;

the subscriber television displaying said portion of said picture after said decoding.

29. The method of claim 28, wherein said compressed picture is a compressed TIFF file.

30. The method of claim 29, wherein said portion of said picture which is the same size as a display screen of said subscriber television.

31. A method for creating an MPEG compressed picture in a video delivery system, wherein the compressed picture is adapted to be scrolled by a user on a viewing device, the method comprising:

creating the compressed picture, wherein said compressed picture comprises a plurality of slices, wherein at least a subset of said plurality of slices are independently compressed, wherein said compressed picture has a size greater than a standard MPEG picture;

creating a table indicating starting points of each of said plurality of slices.

32. The method of claim 31, wherein said creating the compressed picture comprises:

providing a picture to an encoder;

providing picture slice encoding information to the encoder, wherein said picture slice encoding information indicates a slice structure for said plurality of slices;

encoding the picture to create the compressed picture, wherein said encoding uses said picture slice encoding information in said encoding to create said slice structure comprising said plurality of slices, wherein said encoding uses said picture slice encoding information to configure said slice structure of said plurality of slices according to the scrolling boundaries of the picture.

wherein at least a subset of said plurality of slices are independently compressed;

creating a table indicating starting points of each of said plurality of slices.

33. The method of claim 31, wherein said compressed picture comprises an MPEG compressed I picture.

34. The method of claim 33, wherein said compressed picture further comprises a width, wherein said compressed picture further comprises a set of columns of slices when said width is greater than a standard MPEG picture.

35. An interactive television system for displaying a picture and for enabling a user to scroll through the picture, wherein the interactive television system comprises;

a video delivery system for providing video content, wherein the video delivery system provides a compressed picture, wherein said compressed picture comprises a plurality of slices, wherein at least a subset of said plurality of slices are independently compressed, wherein said compressed picture has a size greater than a standard MPEG picture; and at least one subscriber television, wherein the subscriber television is coupled to the video delivery system, wherein the subscriber television comprises:

a decoder for decoding received slices;

a memory coupled to said decoder which stores at least portions of said compressed picture;

an input for receiving scrolling input from a user indicating a portion of said picture which is desired to be viewed;

a processing unit coupled to said memory which operates to provide a subset of said plurality of slices to the decoder in response to said scrolling input, wherein said subset of said plurality of slices correspond to said portion of said picture which is desired to be viewed; and a display unit coupled to an output of said decoder for displaying the output of said decoder, wherein the display unit displays said portion of said picture after said decoding.

36. The system of claim 35, wherein said processing unit directs said memory to provide slices from said compressed picture to accomplish scrolling of said picture.

37. The system of claim 36, wherein the video delivery system provides said compressed picture further comprising a table of starting points of each of said plurality of slices;

wherein the processing unit uses said table to determine location of said plurality of slices comprised in said compressed picture.

38. A set top box which performs video decoding and display operations for a subscriber television, wherein the set top box is operable for scrolling through and displaying a picture, wherein the set top box comprises;

an input for receiving a compressed picture, wherein said compressed picture comprises a plurality of slices, wherein at least a subset of said plurality of slices are independently compressed, wherein said compressed picture has a size greater than a standard MPEG picture;

a decoder for decoding received plurality of slices;

a memory coupled to said input which stores at least portions of said picture, wherein said memory is coupled to provide an output to said decoder;

a processing unit coupled to said memory which operates to provide a subset of said plurality of slices to the decoder in response to a scrolling input, wherein said subset of said plurality of slices correspond to said portion of said picture which is desired to be viewed; and a decoder output coupled to said decoder and operable for coupling to a display unit, wherein said decoder output provides said picture to said display unit.

* * * * *